United States Patent
Britton et al.

(10) Patent No.: US 11,149,505 B2
(45) Date of Patent: Oct. 19, 2021

(54) DRILLING FLUID FLOW MEASUREMENT IN AN OPEN CHANNEL FLUID CONDUIT

(71) Applicant: Halliburton Energy Services, Inc., Houston, TX (US)

(72) Inventors: Charles Cutler Britton, Houston, TX (US); Matthew Henderson, Inverbervie (GB); Adrian Eastland Smith, Rochdale (GB)

(73) Assignee: Halliburton Energy Services, Inc., Houston, TX (US)

( * ) Notice: Subject to any disclaimer, the term of this patent is extended or adjusted under 35 U.S.C. 154(b) by 619 days.

(21) Appl. No.: 14/906,231

(22) PCT Filed: Aug. 22, 2013

(86) PCT No.: PCT/US2013/056292
§ 371 (c)(1),
(2) Date: Jan. 19, 2016

(87) PCT Pub. No.: WO2015/026358
PCT Pub. Date: Feb. 26, 2015

(65) Prior Publication Data
US 2016/0273286 A1    Sep. 22, 2016

(51) Int. Cl.
*E21B 21/08* (2006.01)
*E21B 47/10* (2012.01)
(Continued)

(52) U.S. Cl.
CPC .............. *E21B 21/08* (2013.01); *E21B 21/01* (2013.01); *E21B 47/047* (2020.05); *E21B 47/10* (2013.01); *G01F 1/662* (2013.01)

(58) Field of Classification Search
CPC ........ E21B 21/18; E21B 21/01; E21B 47/042; E21B 47/10; G01F 1/662; G01P 5/245; G01P 5/247; G01P 5/248
(Continued)

(56) References Cited

U.S. PATENT DOCUMENTS 4,145,914 A    3/1979 Newman
4,887,464 A    12/1989 Tannenbaum et al.
(Continued)

FOREIGN PATENT DOCUMENTS

EP    0130653 A1    1/1985
EP    2617939 A1    7/2013
(Continued)

OTHER PUBLICATIONS

International Search Report and Written Opinion issued in related PCT Application No. PCT/US2013/056292 dated May 14, 2014, 13 pages.
(Continued)

*Primary Examiner* — Matthew Troutman
*Assistant Examiner* — Patrick F Lambe
(74) *Attorney, Agent, or Firm* — Benjamin Ford; Baker Botts L.L.P.

(57) ABSTRACT

An example method for determining fluid flow in an open channel fluid conduit may include coupling a sensor assembly to an exterior surface of the open channel fluid conduit. Measurements may be received from the sensor assembly. The method may further include calculating a flow rate of a fluid within the open channel fluid conduit based, at least in part, on the received measurement.

20 Claims, 4 Drawing Sheets

(51) Int. Cl.
*E21B 21/01* (2006.01)
*E21B 47/047* (2012.01)
*G01F 1/66* (2006.01)

(58) Field of Classification Search
USPC .......................................................... 166/66
See application file for complete search history.

(56) References Cited

U.S. PATENT DOCUMENTS

| | | | | |
|---|---|---|---|---|
| 5,063,776 | A * | 11/1991 | Zanker | E21B 21/08 73/1.34 |
| 6,257,354 | B1 * | 7/2001 | Schrader | E21B 21/08 175/38 |
| 6,895,825 | B1 * | 5/2005 | Barkhoudarian | G01F 1/662 73/861.28 |
| 6,931,945 | B2 | 8/2005 | Takeda et al. | |
| 7,624,651 | B2 * | 12/2009 | Fernaid | G01F 1/7082 73/861.27 |
| 2005/0011279 | A1 * | 1/2005 | Takeda | G01F 1/667 73/861.26 |
| 2012/0037361 | A1 | 2/2012 | Santos et al. | |
| 2013/0146359 | A1 * | 6/2013 | Koederitz | G01V 3/38 175/48 |

FOREIGN PATENT DOCUMENTS

| | | |
|---|---|---|
| GB | 2481666 A | 1/2012 |
| WO | 2009037501 A1 | 3/2009 |
| WO | 2012/000654 A1 | 1/2012 |

OTHER PUBLICATIONS

International Preliminary Report on Patentability issued in related PCT application No. PCT/US2013/056292, dated Mar. 3, 2016. 10 pages.

* cited by examiner

United States Patent US 11,149,505 B2

DRILLING FLUID FLOW MEASUREMENT IN AN OPEN CHANNEL FLUID CONDUIT

CROSS-REFERENCE TO RELATED APPLICATION

The present application is a U.S. National Stage Application of International Application No. PCT/US2013/056292 filed Aug. 22, 2013, which is incorporated herein by reference in its entirety for all purposes.

BACKGROUND

The present disclosure relates generally to well drilling operations and, more particularly, to drilling fluid flow measurement in an open channel fluid return.

During the drilling of subterranean wells, a fluid is typically circulated through a fluid circulation system comprising a drilling rig and fluid treatment/storage equipment located substantially at or near the surface of the well. The fluid is pumped by a fluid pump through the interior passage of a drill string, through a drill bit and back to the surface through the annulus between the well bore and the drill string. One function of the fluid is to maintain a primary barrier inside the well bore to prevent formation fluids from flowing to surface. To achieve a primary barrier inside the well bore using the fluid, the hydrostatic pressure of the fluid is maintained higher than the formation fluid pressure ("pore pressure"). If, during drilling of the well bore, a zone is encountered having a higher pore pressure than the fluid pressure inside the well bore, an influx of formation fluid will be introduced into the well bore. This can lead to dangerous conditions such as a blowout if the influx is not quickly identified and addressed. On the other hand, if the hydrostatic pressure of the fluid is too high, the fluid will be lost into the formation, which may reduce the hydrocarbon return of the well. In both cases, the fluid losses and/or fluid influxes may be detected by comparing the fluid volume or flow that is returned to the surface to the fluid volume or flow pumped downhole. Fluid flow detection at the surface, however, is difficult in terms of accuracy, reliability, and speed.

FIGURES

Some specific exemplary embodiments of the disclosure may be understood by referring, in part, to the following description and the accompanying drawings.

Figure 1:
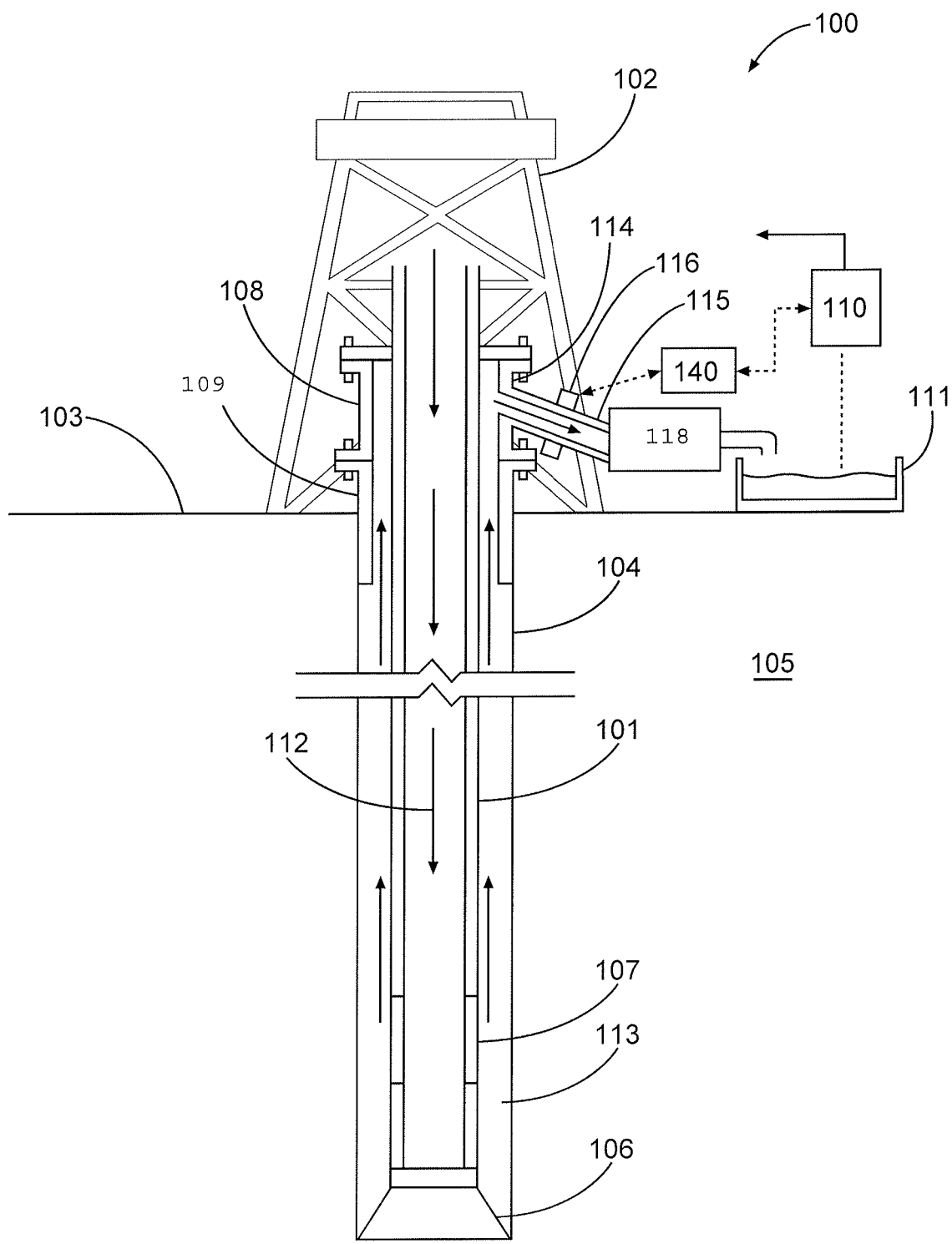
FIG. 1 is a diagram of an example drilling system, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to drilling fluid flow measurement in an open channel fluid return.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to drilling operations that include but are not limited to target (such as an adjacent well) following, target intersecting, target locating, well twinning such as in SAGD (steam assist gravity drainage) well structures, drilling relief wells for blowout wells, river crossings, construction tunneling, as well as horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to one implementation are not intended to be limiting.

Modern petroleum drilling and production operations demand information relating to parameters and conditions downhole. Several methods exist for downhole information collection, including logging while drilling ("LWD") and measurement—while drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

FIG. 1 is a diagram illustrating an example drilling system 100, according to aspects of the present disclosure. The drilling system 100 comprises a tubular drill string 101 that is suspended from a drilling rig 102 at the surface 103 and disposed in a borehole 104 within a formation 105. The drill bit 106 may be coupled to a distal end of the drill string 101, and may be rotated either by a top drive mechanism (not shown) at the surface 103 or by a downhole motor (not shown) to extend the borehole 104. In the embodiment shown, the drill bit 106 is indirectly coupled to the drill string 101 through a bottom-hole assembly (BHA) 107. The BHA 107 may include a variety of MWD/LWD tools, drill collars, steering systems, downhole motors, etc. depending on the drilling application.

The drill string 101 extends downwardly through a surface tubular 108 into the borehole 104. The surface tubular 108 may be coupled to a wellhead 109. The wellhead 109 may include a portion that extends into the borehole 104. In certain embodiments, the wellhead 109 may be secured within the borehole 104 using cement, and may work with the surface tubular 108 and other surface equipment, such as a blowout preventer (BOP) (not shown), to prevent excess pressures from the formation 105 and borehole 104 from being released at the surface 103.

During drilling operations, a pump 110 located at the surface 103 may pump drilling fluid from a fluid reservoir 111 through the upper end of the drill string 101. The drilling fluid may comprise a drilling mud, and may be pumped into the upper end of the drill string 101 at a fluid input flow rate (e.g., gallons per minute). As indicated by arrows 112, the drilling fluid may flow down the interior of drill string 101, through the drill bit 106 and into a borehole annulus 113. The borehole annulus 113 is created by the rotation of the drill string 101 and attached drill bit 106 in borehole 104 and is defined as the space between the interior/inner wall or diameter of borehole 104 and the exterior/outer surface or diameter of the drill string 101. The annular space may extend out of the borehole 104, through the wellhead 109 and into the surface tubular 108.

Fluid pumped into the borehole annulus 113 through the drill string 101 flows upwardly through the borehole annulus 113. Surface tubular 108 is in fluid communication with the borehole annulus 113 and the drilling fluid may exit the borehole annulus 113 into the annular space of the surface tubular 108. The surface tubular 108 may have an outlet port 114 coupled to a fluid conduit 115. The fluid conduit 115 may comprise any pipe or channel structure that conveys fluid to or from a location, and may have a variety of shapes (cylindrical, cuboid, etc.) and sizes. The fluid conduit 115 may be an open channel, where the top surface of fluid within the conduit 115 is bounded by air, rather than a surface of the conduit 115. The position of the top surface of the fluid within the conduit 115 may vary depending on the flow rate of the fluid within the conduit 115. For example, the top surface of the fluid may approach or even contact a top surface of the conduit if the flow rate is high enough.

The fluid conduit 115 in FIG. 1 may also be referred to as a fluid return, where drilling fluid pumped downhole through the drill string 101 returns to the surface 103. Specifically, fluid flowing through the borehole annulus 113 may enter the surface tubular 108 and exit through the outlet 114 to the fluid conduit 115. The fluid flowing through the fluid conduit 115 may do so at a certain flow rate (e.g. gallons per minute). This flow rate may be referred to as a fluid return flow rate, when the fluid conduit 115 functions as a fluid return, as it does in FIG. 1. The fluid conduit 115 may be in fluid communication with at least one fluid treatment mechanism 118, which may include screens that filter out particulates from the fluid before passing the fluid to the surface reservoir 111. In certain embodiments, the fluid conduit 115 may be positioned at an angle slightly less than horizontal so that gravity moves the fluid from the surface tubular 108 to the fluid treatment mechanism 118.

The drilling system 100 may further include a surface controller 140. The surface control unit 140 may comprise an information handling system. According to aspects of the present disclosure, the surface control unit 140 may be communicably coupled to at least the pump 110 and a sensor assembly 116. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, a network terminal, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with exterior devices as well as various input and output (I/O) devices, such as a keyboard, a mouse, and a video display. The information handling system may also include one or more buses operable to transmit communications between the various hardware components.

The formation 105 may contain fluids that are held at the pore pressure. The drilling fluid within the borehole annulus 113 functions partially to balance that pore pressure and prevent the unwanted release of formation fluids into the borehole 104. In certain instances, the hydrostatic pressure of the drilling fluid may be either too high or too low to balance the pore pressure. For example, if the hydrostatic pressure of the drilling fluid is less than the pore pressure, then formation fluid may enter the borehole annulus 113. If left uncorrected, the flow of formation fluid may cause a blowout. On the other hand, if the hydrostatic pressure of the drilling fluid is much greater that the pore pressure, the drilling fluid may penetrate the formation 105, and prevent hydrocarbons from escaping the formation.

The hydrostatic pressure condition may be determined by comparing the fluid input flow rate to the fluid return flow rate. If the hydrostatic pressure is too low, and fluid from formation 105 is introduced into the borehole 104, the fluid return flow rate will exceed the fluid input flow rate due to the additional volume of fluid from the formation 105. Likewise if the hydrostatic pressure is too high, and drilling fluid penetrates the formation 105, the fluid return flow rate will be lower than the fluid input flow rate due to the volume of drilling fluid lost into the formation 105.

Determining the fluid return flow rate can be difficult, however. Attempts to measure the fluid return flow rate directly typically involve placing a sensor directly into the flow of fluid returning to the surface. But the fluid typically contains varying sized particles and larger drill bit cuttings that can damage sensitive sensors and equipment. Likewise, attempts to measure the flow indirectly, such as through a volume change in a fluid containment tank, can be slow and inaccurate.

According to aspects of the present disclosure, the drilling system 100 may comprise a sensor assembly 116 detachably coupled to an outer surface of the fluid conduit 115. The sensor assembly 116 may be part of the drilling system 100, for example, or may comprise stand-alone equipment that is coupled to the fluid conduit 115 after the drilling system 100 is assembled. As will be described below, the sensor assembly 116 may generate measurements that may be used, in part, to directly determine a flow rate of a fluid within the conduit 115, without subjecting the sensor assembly to the flow of fluid within the conduit 115.

Figure 2:
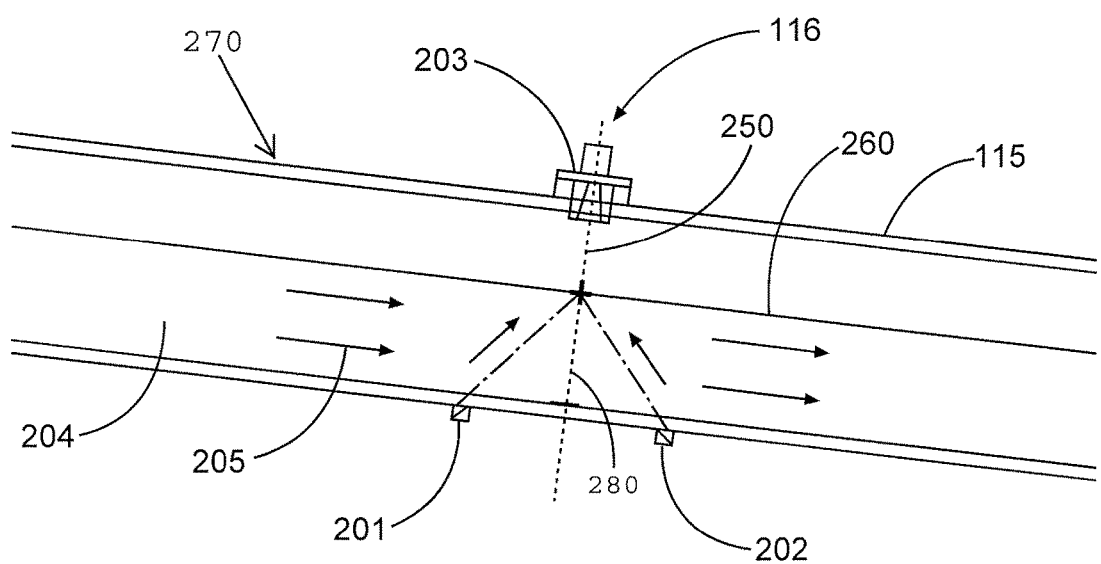
FIG. 2 is a diagram of an example sensor assembly, according to aspects of the present disclosure.

FIG. 2 is a close-up diagram of the sensor assembly 116, according to aspects of the present disclosure. The sensor assembly 116 may comprise one or more sensors 201, 202, and 203 coupled to an exterior surface of the fluid conduit 115. In certain embodiments, the fluid conduit 115 may comprise a metal tubular, or pipe. The fluid conduit 115 may comprise an inner surface 260 that defines an inner bore through which a fluid 204 flows. The fluid conduit may further comprise an exterior surface 270. At least one of the sensors 201, 202, and 203 may be coupled to the exterior surface 270 using a variety of connection mechanisms, such as straps, that would be appreciated by one of ordinary skill in the art in view of this disclosure.

In certain embodiments, the sensor assembly 116 may comprise at least one fluid flow sensor and at least one fluid level sensor. In the embodiment shown, the sensor assembly comprises two fluid flow sensors 201 and 202 and one fluid level sensor 203. As can be seen, the fluid flow sensors 201 and 202 are coupled to an exterior surface of fluid conduit 115, rather than disposed within the fluid 204. Fluid flow sensors 201 and 202 may generate fluid velocity measurements. Fluid velocity measurements may be used to directly determine or calculate a velocity of the fluid 204 within the fluid conduit 115. These fluid velocity measurements may then be used to determine a flow rate of the fluid 204.

The fluid flow sensors 201 and 202 may comprise ultrasonic sensors that measure the velocity using high frequency sound or pressure waves. For example, the fluid flow sensors 201 and 202 may generate the high frequency sound or pressure waves, transmit those waves through the conduit 115 into fluid 204, receive an echo of the high frequency waves, and calculate the time ("transit interval") between transmission of the waves and reception of the echo. Because the velocity of the fluid 204 affects the travel time of the high frequency waves, the velocity of the fluid 204 may be determined from the transit intervals.

In the certain embodiments, at least one fluid flow sensor 201 may be oriented to measure first transit intervals with the flow direction 205 of the fluid 204. Likewise, at least one fluid flow sensor 202 may be oriented to measure second transit intervals against the flow direction 205 of the fluid 204. The first and second intervals then may both be used to determine an average fluid velocity across both sensors 201 and 202. This may increase the accuracy of the velocity measurement, accounting for temporary variations in the fluid, such as large particulates, that may skew the transit intervals. In certain embodiments, the sensors 201 and 202 may periodically measure first and second transit intervals, allowing the velocity of the fluid 204 to be tracked over time.

The fluid level sensor 203 may generate at least one fluid level measurement of the fluid 204 within the fluid conduit 115. These fluid level measurements may then be used, in part, to determine a flow rate of the fluid 204. The fluid level sensor 203 may be coupled to a top surface of the fluid conduit 115 and aligned along the length of the fluid conduit 115 with the flow sensor 201 and 202. The fluid level sensor 203 may comprise a mechanical sensor, an electrical sensor, or some combination of the two. For example, the fluid level sensor 203 may comprise a mechanical float, an ultrasonic or microwave sensor, a wave radar, a nucleonic sensor, or another sensor type that would be appreciated by one of ordinary skill in the art in view of this disclosure.

As described above, because fluid conduit 115 is an open channel, the level or height of fluid 204 is variable. The fluid level of the fluid 204 may correspond to a distance 280 between a surface 260 of the fluid 204 and a bottom interior surface of the fluid conduit 115. The fluid level measurement may comprise a spatial measurement through which the fluid level of the fluid 204 may be determined. For example, in the embodiment shown, the fluid level sensor 203 may determine a distance 250 between the sensor 203 and the surface 260 of the fluid 204. If the total distance between the top and bottom of the fluid conduit 115 is known, the fluid level may be calculated using the measured distance 250.

According to aspects of the present disclosure, the flow rate of the fluid 204 within the fluid conduit 115 may be determined using equation (1):

$$Q=v*A \qquad \text{Equation (1)}$$

where Q comprises a flow rate of the fluid 204; v comprises the velocity of the fluid 204, and A comprises a cross-sectional area of the fluid 204. The velocity v may be directly determined, for example, using the measured transit intervals from the fluid flow sensors 201 and 202. The cross-section area A may be determined, in part, using the fluid level measurement from the fluid level sensor 203. In particular, the fluid level measurement may be used to determine a cross-sectional area A of the fluid 204 if the spatial dimensions of the fluid conduit 115 are known.

Figure 3A:
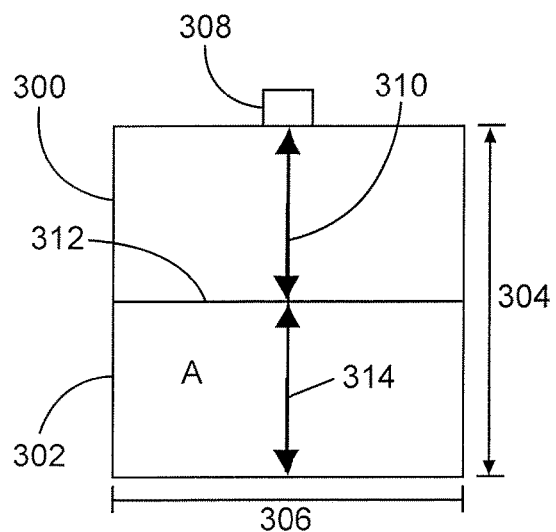
FIGS. 3A and 3B are diagrams showing cross-sections of example fluid conduits, according to aspects of the present disclosure.
Figure 3B:
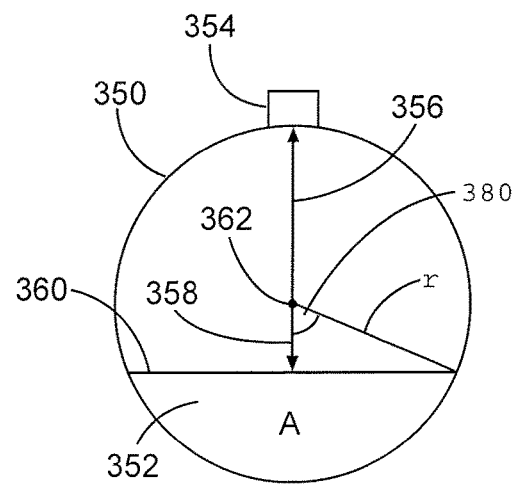

FIGS. 3A and 3B are diagrams showing cross-sections of example fluid conduits 300 and 350, according to aspects of the present disclosure. Fluid conduits 300 and 350 may comprise fluid returns, similar to the fluid return in FIG. 1, but are not limited to embodiments of that type. Fluid conduit 300 is cuboid and has a square cross section with a height dimension 304 and a width dimension 306. A fluid level sensor 308 is positioned on a top surface of the fluid conduit 300. The fluid level sensor 308 may measure the distance 310 between the sensor 308 and the surface 312 of the fluid 302. The distance 310 may then be subtracted from the height 304 of the fluid conduit 300, providing a height dimension 314 of the fluid 302. The height 314 of the fluid 302 may then be multiplied by the width 306 of the fluid conduit 300 to provide the cross-sectional area A of the fluid 302.

Likewise, the cross-sectional area A of the fluid 352 in fluid conduit 350 can be determined using geometric and trigonometric calculations and a measured distance 356 between the sensor 354 and the surface 360 of the fluid 352. In certain embodiments, the distance 356 can be compared to the radius r of the fluid conduit 350 to determine a distance 358 between the surface 360 of the fluid 352 and a center point 362 on the fluid conduit 350. An angle 380 may then be determined using distance 358, radius r, and trigonometric functions that would be appreciated by one of ordinary skill in view of this disclosure. The angle 380 and distance 358 can then be used to determine the area of the circle segment corresponding to the cross-sectional area A of the fluid 352.

In drilling applications, a sensor assembly according to aspects of the present disclosure may take periodic measurements and the flow rate at the fluid return may be calculated for each time period such that can be tracked over time. Likewise, the flow rate of the drilling fluid entering the drill string may be tracked over time and compared to the flow rate at the fluid return. An increasing flow rate in the fluid return that does not correspond to an increasing flow rate entering the drill string indicates that the hydrostatic pressure of the drilling fluid is below the pore pressure of the formation. Conversely, a decreasing flow rate in the fluid return that does not correspond to a decreasing flow rate entering the drill string indicates that the hydrostatic pressure of the drilling fluid is too high and drilling fluid is being lost into the formation. In certain embodiments, the hydrostatic pressure of the drilling fluid may be changed based on the above comparison. Changing the hydrostatic pressure of the drilling fluid may include, for example, changing a fluid or chemical property of the drilling fluid before it is pumped into the borehole.

Figure 4:
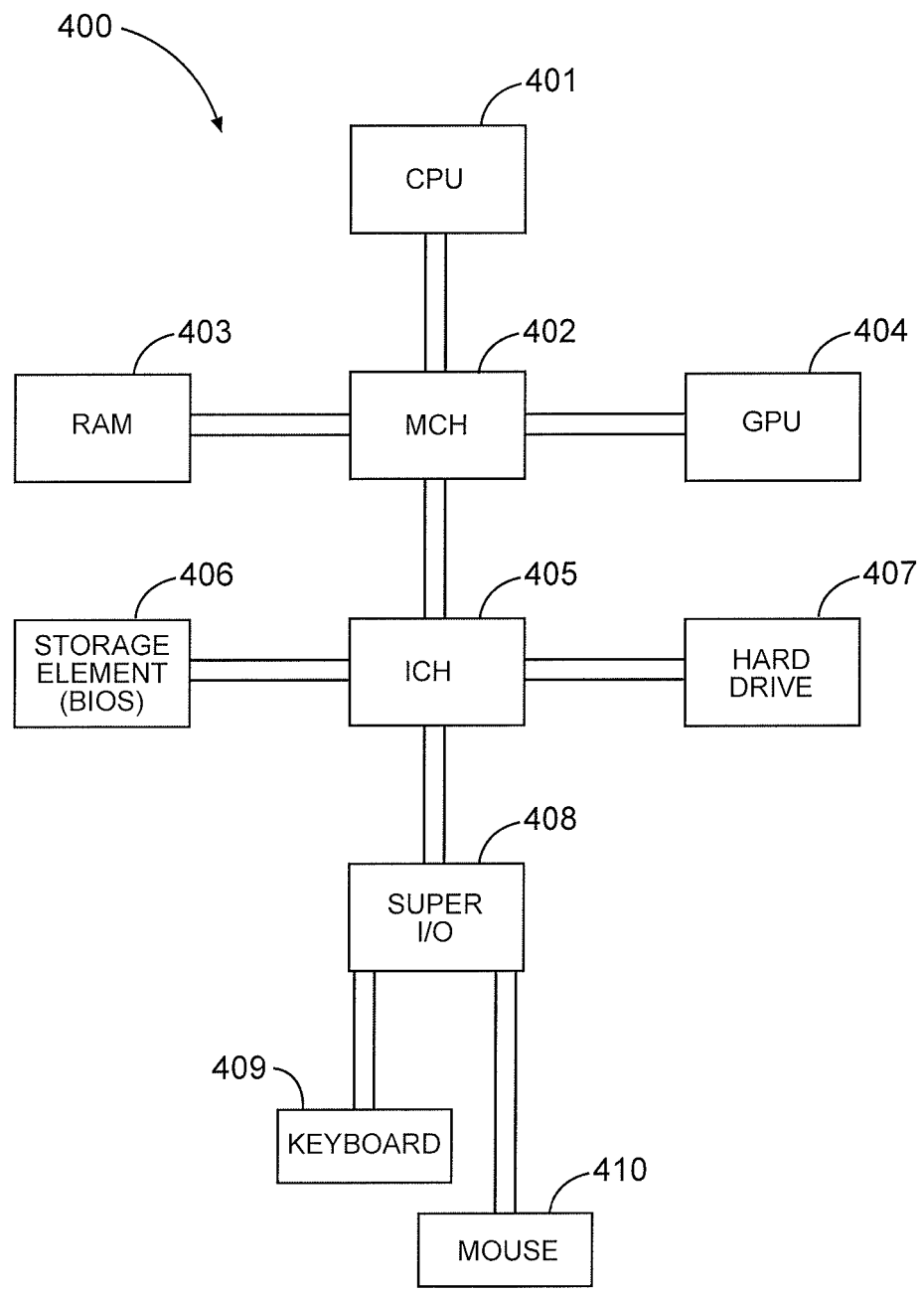
FIG. 4 is a block diagram of an example information handling system, according to aspects of the present disclosure.

In certain embodiments, some or all of the above calculations may be performed at a processor of an information handling system using algorithms stored within a memory device of the information handling system. FIG. 4 is a block diagram of an example information handling system 400. A processor or CPU 401 of the information handling system 400 is communicatively coupled to a memory controller hub or north bridge 402. Memory controller hub 402 may include a memory controller for directing information to or from various system memory components within the information handling system, such as RAM 403, storage element 406, and hard drive 407. The memory controller hub 402 may be coupled to RAM 403 and a graphics processing unit 404. Memory controller hub 402 may also be coupled to an I/O controller hub or south bridge 405. I/O hub 405 is coupled to storage elements of the computer system, including a storage element 406, which may comprise a flash ROM that includes a basic input/output system (BIOS) of the computer system. I/O hub 405 is also coupled to the hard drive 407 of the computer system. I/O hub 405 may also be coupled to a Super I/O chip 408, which is itself coupled to several of the I/O ports of the computer system, including keyboard 409 and mouse 410. In certain embodiments, the Super I/O chip may also be connected to and receive input from a sensor assembly, similar to the sensor assembly from FIG. 2. The chip 408 may receive input from the sensor assembly directly, or indirectly, through an intermediate device.

A memory device within the information handling system, such as hard drive 407, may contain a set of instructions that, when executed by the processor 401, cause the processor 401 to perform certain actions. The set of instructions, for example, may cause the processor 401 to receive measurements from a sensor assembly coupled to an exterior surface of a fluid conduit. The set of instructions may further cause the processor 401 to calculate a first flow rate of a fluid within the fluid conduit based on the received measurements. In certain embodiments, the fluid conduit may comprise a fluid return in of a drilling system, and the processor 401 may also receive or determine a second flow rate of the fluid entering a drill string. For example, the processor 401 may be coupled to a pump and receive a flow rate directly from the pump. The instructions may further cause the processor 401 to compare the first flow rate and the second flow rate to determine a hydrostatic pressure condition within a borehole.

In certain embodiments, the sensor assembly may comprise at least one fluid flow sensor and at least one fluid level sensor, and the measurements received by processor 401 may comprise a fluid velocity measurement and a fluid level measurement. In certain embodiments, the fluid flow sensor may comprise an ultrasonic sensor, and the fluid velocity measurement may comprise a transit interval measured by the fluid flow sensor. The fluid level measurement may directly indicate the fluid level within the fluid conduit if, for example, a mechanical float type sensor is used. In certain embodiments, a memory device, such as hard drive 407, may contain the physical parameters of the fluid conduit, and the processor may calculate the fluid level within the fluid conduit using the fluid level measurement and the physical parameters of the fluid conduit.

The processor 401 may determine the first flow rate of a fluid within the fluid using Equation (1), where Q comprises the first flow rate; v comprises the velocity of the fluid, and A comprises a cross-sectional area of the fluid. The velocity v may be determined, in part, using the received fluid velocity measurements. The cross-sectional area A may be determined, in part, using the fluid level measurement. For example, as described above, the fluid level measurement may be used with the physical parameters of the fluid conduit to determine the cross-sectional area A.

Figure 5:
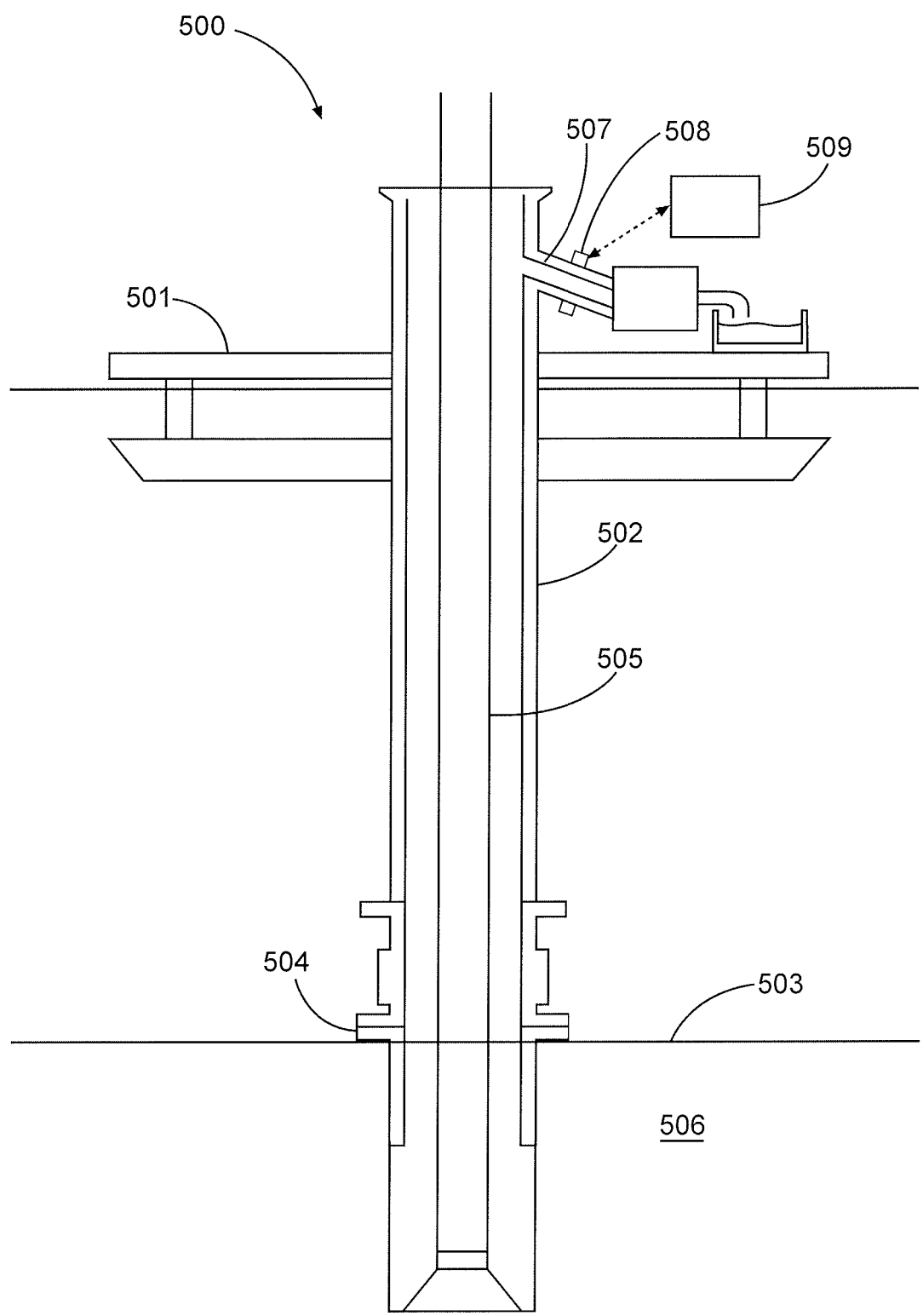
FIG. 5 is a diagram of an example offshore drilling system, according to aspects of the present disclosure.

Although the sensor assembly has been described herein in the context of a conventional drilling assembly positioned at the surface, the sensor assembly may similarly be used with different drilling assemblies (e.g., wirelines, slickline, etc.) in different locations. FIG. 5 is a diagram of an offshore drilling system 500, according to aspects of the present disclosure. As can be seen, portions of the drilling system 500 may be positioned on a floating platform 501. A tubular 502 may extend from the platform 501 to the sea bed 503, where the well head 504 is located. A drill string 505 may be positioned within the tubular 502, and may be rotated to penetrate the formation 506. Drilling may be circulated downhole within the drill string 505 and return to the surface in an annulus between the drill string 505 and the tubular 502. A proximal portion of the tubular 502 may comprise a fluid conduit 507 coupled thereto. The fluid conduit 507 may function as a fluid return, and a sensor assembly 508, according to aspects of the present disclosure, may be coupled to an exterior surface of the fluid conduit 507. Likewise, the sensor assembly 508 may be communicably coupled to an information handling system 509 positioned on the platform 501.

According to aspects of the present disclosure, an example method for determining fluid flow in an open channel fluid conduit may include coupling a sensor assembly to an exterior surface of the open channel fluid conduit. The method may further include receiving a measurement from the sensor assembly. The method may further include calculating a flow rate of a fluid within the open channel fluid conduit based, at least in part, on the received measurement.

In some embodiments, the sensor assembly comprises at least one fluid flow sensor and at least one fluid level sensor. In certain embodiments, the at least one fluid flow sensor comprises an ultrasonic sensor. In certain embodiments, the at least on fluid flow sensor comprises a first ultrasonic sensor aligned to measure a first transit interval with a flow direction of the fluid and a second ultrasonic sensor aligned to measure a second transit interval against a flow direction of the fluid. In any of the above embodiments described in this or the preceding paragraph, the at least one fluid level sensor may comprise at least one of a mechanical float, an ultrasonic sensor, a microwave sensor, a wave radar, or a nucleonic sensor. In any of the above embodiments described in this or the preceding paragraph, the measurement may comprise a fluid velocity measurement and a fluid level measurement of the fluid. The fluid velocity measurement comprises a transit interval.

In any of the above embodiments described in this or the preceding two paragraphs, calculating the flow rate of the fluid may comprise solving the following equation:

$$Q=v*A$$

where Q comprises the flow rate of the fluid; v comprises the velocity of the fluid, and A comprises a cross-sectional area of the fluid within the fluid conduit. The velocity v of the fluid may be determined based, at least in part, on the fluid velocity measurement. The cross-sectional area A may be determined based, at least in part, on the fluid level measurement and at least one physical characteristic of the fluid conduit.

According to aspects of the present disclosure, and example apparatus for determining fluid flow in an open channel fluid conduit may comprise a sensor assembly coupled to an exterior surface of the open channel fluid conduit. The apparatus may also include an information handling system communicably coupled to the sensor assembly, wherein the information handling system comprises a processor and a memory device that contains a set of instructions that, when executed by the processor, cause the processor to receive a measurement from the sensor assembly and calculate a flow rate of a fluid within the open channel fluid conduit based, at least in part, on the received measurement.

In certain embodiments, the sensor assembly comprises at least one fluid flow sensor and at least one fluid level sensor. In certain embodiments, the at least one fluid flow sensor comprises an ultrasonic sensor. In certain embodiments, the at least on fluid flow sensor comprises a first ultrasonic sensor aligned to measure a first transit interval with a flow direction of the fluid and a second ultrasonic sensor aligned to measure a second transit interval against a flow direction of the fluid. In any of the above embodiments described in this or the preceding paragraph the at least one fluid level sensor may comprise at least one of a mechanical float, an ultrasonic sensor, a microwave sensor, a wave radar, or a nucleonic sensor. In any of the above embodiments described in this or the preceding paragraph, the measurement may comprise a fluid velocity measurement and a fluid level measurement of the fluid. In certain embodiments, the fluid velocity measurement comprises a transit interval.

In any embodiment described in the preceding two paragraphs, calculating the flow rate of the fluid may comprise solving the following equation:

$$Q=v*A$$

where Q comprises the flow rate of the fluid; v comprises the velocity of the fluid, and A comprises a cross-sectional area of the fluid within the fluid conduit. In certain embodiments, the velocity v of the fluid is determined based, at least in part, on the fluid velocity measurement; and the cross-sectional area A is determined based, at least in part, on the fluid level measurement and at least one physical characteristic of the fluid conduit.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method for determining fluid flow in an open channel fluid conduit, comprising:
   generating, by a sensor assembly, a measurement, wherein the sensor assembly is coupled to an exterior surface of the open channel fluid conduit such that the sensor assembly generates the measurement without subjecting the sensor assembly to a fluid flow within the open channel fluid conduit, wherein the sensor assembly comprises a plurality of sensors, and wherein the plurality of sensors are coupled to the exterior surface of the open channel fluid conduit, wherein generating the measurement comprises:
      generating, by a first sensor of a plurality of sensors of a sensor assembly, a first wave through the open channel fluid conduit into the fluid, wherein the first sensor is oriented with a flow direction of the fluid;
      receiving, by the first sensor, a first echo of the first wave;
      measuring, by the first sensor, a first transit interval of the fluid;
      generating, by a second sensor of the plurality of sensors of the sensor assembly, a second wave through the open channel fluid conduit into the fluid, wherein the second sensor is oriented against the flow direction of the fluid;
      receiving, by the second sensor, a second echo of the second wave; and
      measuring, by the second sensor, a second transit interval of the fluid;
   receiving the measurement from the sensor assembly, wherein the measurement comprises the measured first transit interval and the measured second transit interval;
   calculating a flow rate of the fluid within the open channel fluid conduit based, at least in part, on the received measurement; and
   changing a hydrostatic pressure of the fluid based on the flow rate.

2. The method of claim 1, wherein the plurality of sensors comprises at least one fluid flow sensor and at least one fluid level sensor.

3. The method of claim 2, wherein the at least one fluid flow sensor comprises an ultrasonic sensor.

4. The method of claim 2, wherein the at least one fluid flow sensor comprises:
   a first ultrasonic sensor aligned to measure a first transit interval with a flow direction of the fluid; and
   a second ultrasonic sensor aligned to measure a second transit interval against a flow direction of the fluid.

5. The method of claim 2, wherein the at least one fluid level sensor comprises at least one of a mechanical float, an ultrasonic sensor, a microwave sensor, a wave radar, or a nucleonic sensor.

6. The method of claim 1 wherein the measurement comprises a fluid velocity measurement and a fluid level measurement of the fluid.

7. The method of claim 6, wherein the fluid velocity measurement is based on the measured first transit interval and the measured second transit interval measurement.

8. The method of claim 6, wherein calculating the flow rate of the fluid comprises solving the following equation:

$$Q=v*A$$

where Q comprises the flow rate of the fluid; v comprises the velocity of the fluid, and A comprises a cross-sectional area of the fluid within the open channel fluid conduit.

9. The method of claim 8, wherein
the velocity v of the fluid is determined based, at least in part, on the measured first transit interval and the measured second transit interval; and
the cross-sectional area A is determined based, at least in part, on the fluid level measurement and at least one physical characteristic of the open channel fluid conduit.

10. An apparatus for determining fluid flow in an open channel fluid conduit, comprising:
a sensor assembly coupled to an exterior surface of the open channel fluid conduit such that the sensor assembly generates a measurement without subjecting the sensor assembly to a fluid flow of a fluid within the open channel fluid conduit, wherein the sensor assembly comprises a plurality of sensors, and wherein:
a first sensor of the plurality of sensors generates a first wave through the open channel fluid conduit into the fluid, receives a first echo of the first wave and measures a first transit interval of the fluid, wherein the first sensor is oriented to measure the first transit interval with a flow direction of the fluid; and
a second sensor of the plurality of sensors generates a second wave through the open channel fluid conduit into the fluid, receives a second echo of the second wave, and measures a second transit interval of the fluid, wherein the second sensor is oriented to measure to a second transit interval against the flow direction of the fluid;
an information handling system communicably coupled to the sensor assembly, wherein the information handling system comprises a processor and a memory device that contains a set of instructions that, when executed by the processor, cause the processor to
receive the measurement from the sensor assembly, wherein the measurement comprises the measured first transit interval and the measured second transit interval; and
calculate a flow rate of the fluid within the open channel fluid conduit based, at least in part, on the received measurement.

11. The apparatus of claim 10, wherein the plurality of sensors comprise at least one fluid flow sensor and at least one fluid level sensor.

12. The apparatus of claim 11, wherein the at least one fluid flow sensor comprises an ultrasonic sensor.

13. The apparatus of claim 11, wherein the at least one fluid flow sensor comprises:
a first ultrasonic sensor aligned to measure a first transit interval with a flow direction of the fluid; and
a second ultrasonic sensor aligned to measure a second transit interval against a flow direction of the fluid.

14. The apparatus of claim 11, wherein the at least one fluid level sensor comprises at least one of a mechanical float, an ultrasonic sensor, a microwave sensor, a wave radar, or a nucleonic sensor.

15. The apparatus of claim 10, wherein the measurement comprises a fluid velocity measurement and a fluid level measurement of the fluid.

16. The apparatus of claim 15, wherein the fluid velocity measurement is based on the measured first transit interval and the measured second transit interval measurement.

17. The apparatus of claim 15, wherein calculating the flow rate of the fluid comprises solving the following equation:

$$Q=v*A$$

where Q comprises the flow rate of the fluid; v comprises the velocity of the fluid, and A comprises a cross-sectional area of the fluid within the open channel fluid conduit.

18. The apparatus of claim 17, wherein
the velocity v of the fluid is determined based, at least in part, on the measured first transit interval and the measured second transit interval; and
the cross-sectional area A is determined based, at least in part, on the fluid level measurement and at least one physical characteristic of the open channel fluid conduit.

19. A system for controlling hydrostatic pressure of a drilling fluid within a borehole into a formation, comprising:
a drill string disposed within the borehole, wherein the drill string and the borehole define an annulus;
a pump that directs drilling fluid into an interior bore of a drill string at a first flow rate;
an open channel fluid conduit in fluid communication with the annulus;
a sensor assembly coupled to an exterior surface of the open channel fluid conduit such that the sensor assembly generates a measurement without subjecting the sensor assembly to a fluid flow within the open channel fluid conduit, wherein the sensor assembly comprises a plurality of sensors, wherein the plurality of sensors are coupled to the exterior surface of the open channel fluid conduit, wherein:
a first sensor of the plurality of sensors generates a first wave through the open channel fluid conduit into the fluid, receives a first echo of the first wave and measures a first transit interval of the fluid, wherein the first sensor is oriented to measure a first transit interval with a flow direction of the drilling fluid; and
a second sensor of the plurality of sensors generates a second wave through the open channel fluid conduit into the fluid, receives a second echo of the second wave, and measures a second transit interval of the fluid, wherein the second sensor is oriented to measure to a second transit interval against the flow direction of the drilling fluid;
an information handling system communicably coupled to the sensor assembly, wherein the information handling system comprises a processor and a memory device that contains a set of instructions that, when executed by the processor, cause the processor to
receive the first flow rate;
receive the measurement from the sensor assembly, wherein the measurement comprises the measured first transit interval and the measured second transit interval;
calculate a second flow rate of the drilling fluid within the open channel fluid conduit based, at least in part, on the received measurement;
compare the first flow rate to the second flow rate; and
identify a hydrostatic pressure condition of the drilling fluid based on the comparison.

20. The system of claim 19, wherein the one or more sensors comprise a fluid level sensor and at least one ultrasonic fluid flow sensor.

\* \* \* \* \*